US008970062B2

(12) United States Patent
Kunimitsu et al.

(10) Patent No.: US 8,970,062 B2
(45) Date of Patent: Mar. 3, 2015

(54) AUTOMOTIVE POWER SOURCE APPARATUS AND VEHICLE EQUIPPED WITH THE POWER SOURCE APPARATUS

(71) Applicant: Sanyo Electric Co., Ltd., Moriguchi, Osaka (JP)

(72) Inventors: Tomonori Kunimitsu, Himeji (JP); Tsuyoshi Watanabe, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 345 days.

(21) Appl. No.: 13/628,417

(22) Filed: Sep. 27, 2012

(65) Prior Publication Data
US 2013/0076129 A1    Mar. 28, 2013

(30) Foreign Application Priority Data
Sep. 28, 2011    (JP) .................................. 2011-213496

(51) Int. Cl.
*B60L 11/18* (2006.01)
(52) U.S. Cl.
CPC ......... *B60L 11/1859* (2013.01); *B60L 11/1861* (2013.01); *B60L 2240/547* (2013.01); *Y02T 10/7044* (2013.01); *Y02T 10/7005* (2013.01); *Y02T 10/705* (2013.01)
USPC ........................... 307/10.7; 307/9.1; 307/10.1
(58) Field of Classification Search
USPC ........................................ 307/10.7, 9.1, 10.1
See application file for complete search history.

(56) References Cited

U.S. PATENT DOCUMENTS

2007/0285057 A1* 12/2007 Yano .............................. 320/116
2008/0111556 A1    5/2008 Yano

FOREIGN PATENT DOCUMENTS

JP    2008-125236    5/2008

* cited by examiner

*Primary Examiner* — Rexford Barnie
*Assistant Examiner* — Shon Ly
(74) *Attorney, Agent, or Firm* — Wenderoth, Lind & Ponack, LLP

(57) ABSTRACT

The power source apparatus has high-voltage-side power supply circuitry 4 that supplies driving battery 1 power to the first measurement circuit 2 and the second measurement circuit 3, isolation circuitry 5 that isolates output from the first measurement circuit 2 and the second measurement circuit 3 and outputs it to the vehicle-side, and low-voltage-side power supply circuitry 6 that supplies vehicle auxiliary battery 7 (12V) power to the isolation circuitry 5. The first measurement circuit 2, which is powered by the high-voltage-side power supply circuitry 4, outputs voltage signals to the vehicle-side via the first isolation circuit 5A, which is powered by the first low-voltage-side power supply circuit 6A, and the second measurement circuit 3, which is powered by the high-voltage-side power supply circuitry 4, outputs battery 10 error signals to the vehicle-side via the second isolation circuit 5B, which is powered by the second low-voltage-side power supply circuit 6B.

5 Claims, 5 Drawing Sheets

AUTOMOTIVE POWER SOURCE APPARATUS AND VEHICLE EQUIPPED WITH THE POWER SOURCE APPARATUS

BACKGROUND OF THE INVENTION

1. Field of the Invention

The present invention relates to an automotive power source apparatus that detects the voltages of batteries making up the driving battery that drives a vehicle, that is further provided with circuitry to detect over-charging and over-discharging of those batteries, and relates to a vehicle equipped with the power source apparatus.

2. Description of the Related Art

An automotive power source apparatus detects the voltages of batteries making up the driving battery, and controls driving battery charging and discharging while protecting the batteries. This type of power source apparatus has a plurality of batteries connected in series to increase output voltage and attain high power output. The voltage of each battery is detected and charging and discharging are controlled while monitoring over-charging, over-discharging, and voltage balance between batteries. If voltage imbalance develops between batteries, a certain battery or batteries can be easily over-charged or over-discharged. Over-charging and over-discharging markedly degrade battery characteristics and significantly reduce battery lifetime. Additionally, an automotive power source apparatus has been developed with two circuits to detect battery voltage and further increase reliability with redundancy.

Refer to Japanese Laid-Open Patent Publication 2008-125236.

If one of the circuits malfunctions in an automotive power source apparatus that detects battery voltage with two circuits, voltage can still be detected with the other circuit thereby improving reliability. The circuits that detect battery voltage could be powered by the 12V auxiliary battery (accessory battery) installed in the vehicle. However, such a circuit configuration requires the driving battery ground line to be connected to the vehicle chassis ground. If the driving battery ground line is connected to the vehicle chassis ground, the high-voltage driving battery cannot be isolated from chassis ground and it becomes difficult to insure safety and prevent electric shock.

This drawback can be resolved by supplying power from the driving battery to operate the circuits that detect voltage in the driving battery, and isolating signals output from those circuits to the vehicle-side via an isolation circuit. However, this circuit configuration has the drawback that if the isolation circuit malfunctions, battery voltage signals cannot be transmitted to the vehicle-side even though the circuits that detect voltage may be operating properly.

The present invention was developed with the object of further resolving the drawbacks described above. Thus, it is a primary object of the present invention to provide an automotive power source apparatus and vehicle equipped with the power source apparatus that can more reliably and stably transmit battery voltage signals to the vehicle-side while insuring safety by isolating the driving battery from the vehicle chassis ground.

SUMMARY OF THE INVENTION

The automotive power source apparatus of the present invention is provided with a driving battery 1 that supplies power to the motor that drives a vehicle, a first measurement circuit 2 that detects voltage of the individual batteries 10 that make up the driving battery 1, and a second measurement circuit 3 that detects over-charging and over-discharging of the batteries 10 that make up the driving battery 1. The driving battery 1 is isolated from the vehicle chassis ground 9. The automotive power source apparatus is further provided with high-voltage-side power supply circuitry 4 that supplies power from the driving battery 1 to the power supply lines of the first measurement circuit 2 and the second measurement circuit 3, isolation circuitry 5 that isolates output from the first measurement circuit 2 and the second measurement circuit 3 and outputs it to the vehicle-side, and low-voltage-side power supply circuitry 6 that supplies power to the power supply lines of the isolation circuitry 5 using the vehicle (12V) auxiliary battery 7 as the power source. Isolation circuitry 5 is made up of a first isolation circuit 5A that isolates output from the first measurement circuit 2 and outputs it to the vehicle-side, and a second isolation circuit 5B that isolates output from the second measurement circuit 3 and outputs it to the vehicle-side. Further, low-voltage-side power supply circuitry 6 is made up of a first low-voltage-side power supply circuit 6A that supplies power to the power supply line of the first isolation circuit 5A, and a second low-voltage-side power supply circuit 6B that supplies power to the power supply line of the second isolation circuit 5B. The high-voltage-side power supply circuitry 4 supplies power from the driving battery 1 to the power supply lines of the first measurement circuit 2 and the second measurement circuit 3, the first low-voltage-side power supply circuit 6A supplies power to the power supply line of the first isolation circuit 5A, and the second low-voltage-side power supply circuit 6B supplies power to the power supply line of the second isolation circuit 5B. The first measurement circuit 2, which is powered by the high-voltage-side power supply circuitry 4, outputs voltage signals to the vehicle-side via the first isolation circuit 5A, which is powered by the first low-voltage-side power supply circuit 6A, and the second measurement circuit 3, which is powered by the high-voltage-side power supply circuitry 4, outputs battery 10 abnormality (error) signals to the vehicle-side via the second isolation circuit 5B, which is powered by the second low-voltage-side power supply circuit 6B.

The power source apparatus described above can more reliably and stably transmit battery voltage signals and error signals to the vehicle-side while insuring safety by isolating the driving battery from the vehicle chassis ground. This is because the power supply lines of the first measurement circuit, which detects battery voltage, and the second measurement circuit, which detects over-charging and over-discharging, are supplied with power from the high-voltage-side power supply circuitry that outputs voltage-converted power from the driving battery and isolates the driving battery-side ground lines from chassis ground. Signals from the first measurement circuit and the second measurement circuit, which are isolated from chassis ground, are output to the vehicle-side via isolation circuitry. First measurement circuit signals are isolated and output to the vehicle-side by the first isolation circuit, and second measurement circuit signals are isolated and output to the vehicle-side by the second isolation circuit. Further, the first isolation circuit is supplied with power from the first low-voltage-side power supply circuit, which outputs voltage-converted power from the auxiliary battery, and the second isolation circuit is supplied with power from the second low-voltage-side power supply circuit. In this automotive power source apparatus, if there is a malfunction in either the first measurement circuit, first isolation circuit, and first low-voltage-side power supply circuit path, or the second measurement circuit, second isolation circuit, and second lowvoltage-side power supply circuit path, battery voltage or battery over-charging and over-discharging signals can still be reliably output to the vehicle-side. This redundancy enables vehicle-side control to charge and discharge the driving battery while insuring safe operation.

The automotive power source apparatus of the present invention can be further provided with a central processing unit (CPU) 8 that computationally processes first measurement circuit 2 output signals, and the signals processed by the CPU 8 can be output to the vehicle-side via the first isolation circuit 5A. In this power source apparatus, signals detected by the first measurement circuit can be processed by the CPU and output to the vehicle-side. Accordingly, the voltage of each battery can be detected and output to the vehicle-side by a first measurement circuit having a simple voltage detection circuit structure. For example, the first measurement circuit can simply detect voltage at connection nodes of the plurality of series-connected batteries in the driving battery.

In the automotive power source apparatus of the present invention, the first isolation circuit 5A can be provided with an isolating direct current-to-direct current (DC/DC) converter 12 to isolate power from the first low-voltage-side power supply circuit 6A and supply it to the CPU 8. In this power source apparatus, power from an isolating DC/DC converter integrated into the isolation circuitry can be supplied to the CPU installed on the high-voltage-side. Specifically, auxiliary battery power can be converted to the CPU operating voltage by the low-voltage-side power supply circuitry and the DC/DC converter in the isolation circuitry and supplied to the CPU. This eliminates the need to supply power to the CPU from the driving battery and allows reduction in the power consumption drain on the driving battery. Further, since the CPU is not supplied with power from one segment of batteries in the driving battery, generation of voltage imbalance between batteries in the driving battery can be suppressed.

The automotive power source apparatus of the present invention can be further provided with a CPU 8 that computationally processes first isolation circuit 5A output signals, the low-voltage-side power supply circuitry 6 can supply operating power to the CPU 8, and the signals processed by the CPU 8 can be output to the vehicle-side. In this power source apparatus, since the CPU is installed on the output-side of the first isolation circuit, namely on the low-voltage-side, the CPU is grounded to the chassis ground. Further, since the CPU is supplied with power from the low-voltage-side power supply circuitry without intervention of an isolation circuit DC/DC converter, the power source apparatus is characterized by simplified CPU power supply circuitry.

The vehicle of the present invention is equipped with any one of the power source apparatus cited above. The above and further objects of the present invention as well as the features thereof will become more apparent from the following detailed description to be made in conjunction with the accompanying drawings.

DETAILED DESCRIPTION OF THE EMBODIMENTS

The following describes embodiments of the present invention based on the figures. However, the following embodiments are merely specific examples of an automotive power source apparatus and vehicle equipped with the power source apparatus representative of the technology associated with the present invention, and the automotive power source apparatus and vehicle of the present invention are not limited to the embodiments described below.

Figure 1:
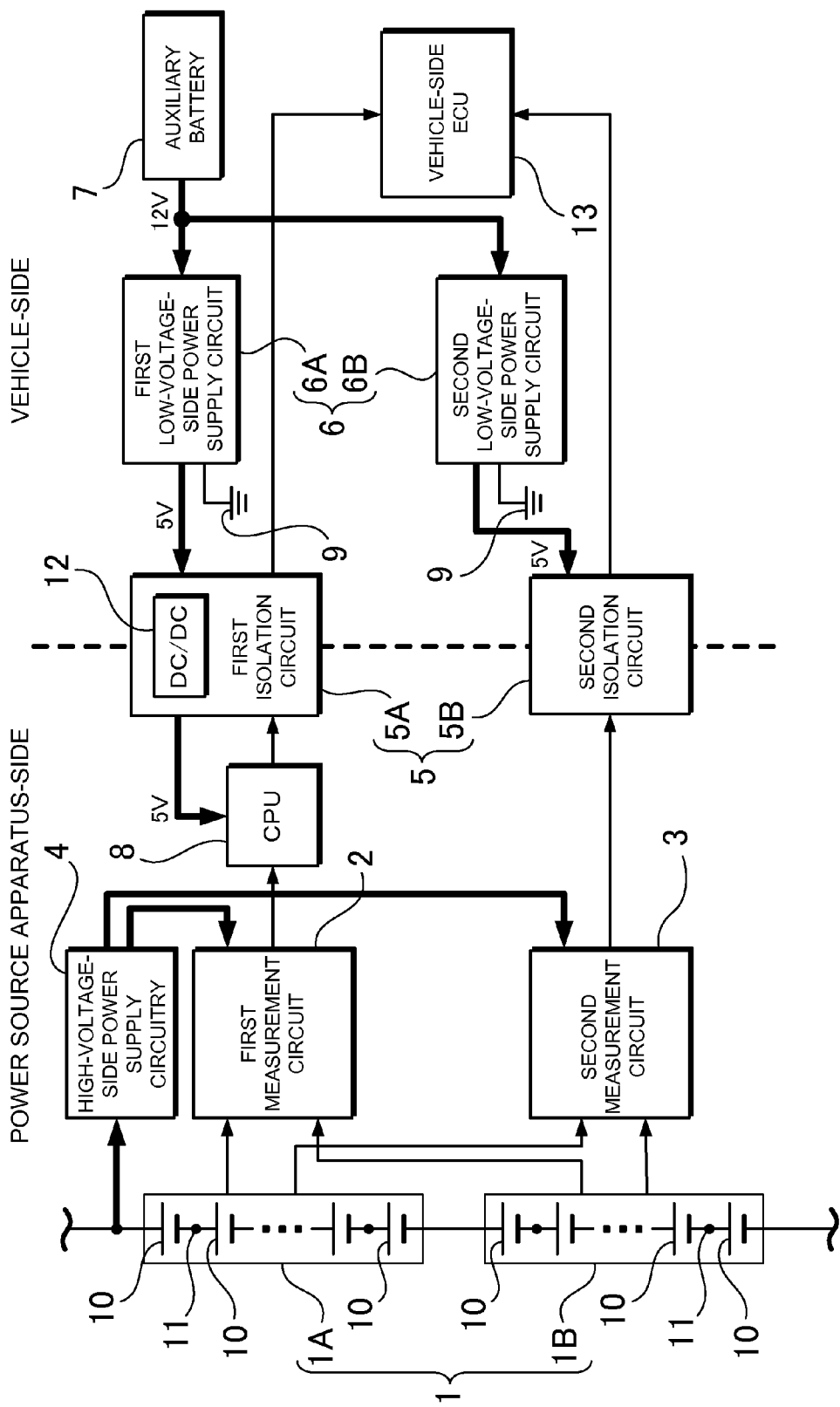
FIG. 1 is a block diagram of an automotive power source apparatus for an embodiment of the present invention.
Figure 2:
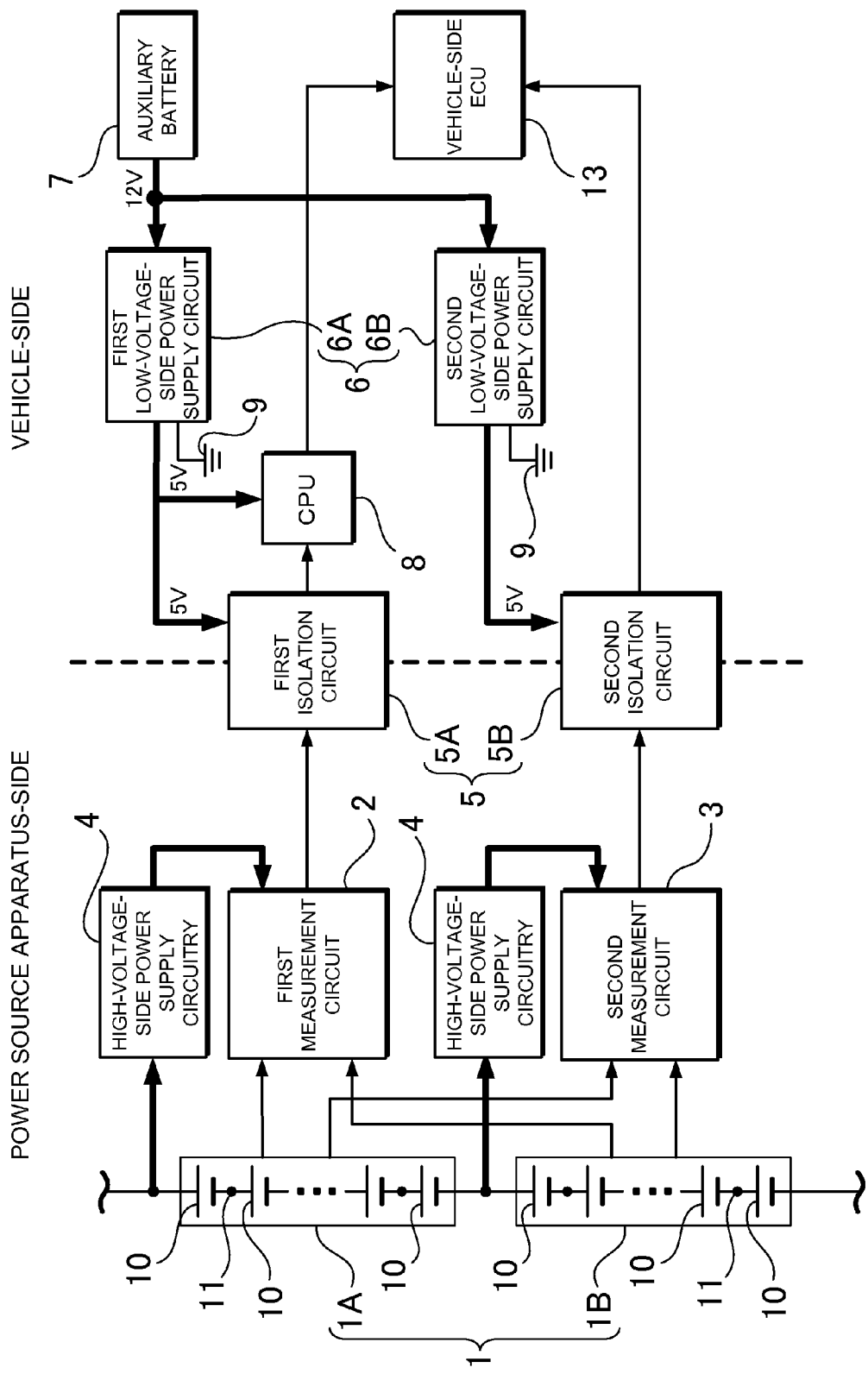
FIG. 2 is a block diagram of an automotive power source apparatus for another embodiment of the present invention.

The automotive power source apparatus shown in the block diagrams of FIGS. 1 and 2 are provided with a driving battery 1 having a plurality of batteries 10 connected together in series at connection nodes 11, a first measurement circuit 2 that detects the voltage and status of each battery 10 in the driving battery 1, a second measurement circuit 3 that detects voltage and detects over-charging and over-discharging for each battery 10, high-voltage-side power supply circuitry 4 that supplies power to the power supply lines of the first measurement circuit 2 and second measurement circuit 3, a first isolation circuit 5A that isolates first measurement circuit 2 output signals and outputs them to the vehicle-side, a second isolation circuit 5B that isolates second measurement circuit 3 output signals and outputs them to the vehicle-side, a first low-voltage-side power supply circuit 6A that supplies power to the power supply line of the first isolation circuit 5A using the vehicle auxiliary battery as the power source, and a second low-voltage-side power supply circuit 6B that supplies power to the power supply line of the second isolation circuit 5B. In FIGS. 1 and 2, power supply lines are shown as bold (wide) lines to clarify the source of operating power supplied to each circuit from the driving battery 1 and the vehicle (12V) auxiliary battery 7.

The power source apparatus shown in FIGS. 1 and 2 are also provided with a CPU 8 that computationally processes first measurement circuit 2 output for output to the vehicle-side. In the power source apparatus of FIG. 1, the CPU 8 is installed on the high-voltage power source apparatus-side, and CPU 8 output is isolated by the first isolation circuit 5A for output to the low-voltage vehicle-side. Since the CPU 8 is installed on the low-voltage vehicle-side of the power source apparatus of FIG. 2, first measurement circuit 2 output is isolated by the first isolation circuit 5A and output to the CPU 8, which outputs directly to the vehicle-side without isolation.

In the automotive power source apparatus shown in FIG. 1, the first measurement circuit 2, the second measurement circuit 3, and the CPU 8 are disposed on the high-voltage-side, and the first low-voltage-side power supply circuit 6A and the second low-voltage-side power supply circuit 8B are disposed on the low-voltage-side. The high-voltage-side and the low-voltage-side are isolated by the first isolation circuit 5A and the second isolation circuit 5B, which transmit signals from the high-voltage-side to the low-voltage-side.

In the automotive power source apparatus shown in FIG. 2, the first measurement circuit 2 and the second measurement circuit 3 are disposed on the high-voltage-side, and the CPU 8, the first low-voltage-side power supply circuit 6A, and the second low-voltage-side power supply circuit 8B are disposed on the low-voltage-side.

The isolation circuitry 5 enables two-way communication and is configured to isolate signals output from the power source apparatus-side to the vehicle-side, as well as to output isolated signals from the vehicle-side to the power source apparatus-side. Detection signals from the first measurement circuit 2, the second measurement circuit 3, and the CPU 8, as well as control signals from the vehicle-side electronic control unit (ECU) 13 are specific examples of signals isolated by the isolation circuitry 5. Although specific circuit architecture for isolated communication is not indicated, any of a variety of schemes can be adopted such as transformer isolation (via magnetic coupling) or optical isolation via devices such as photo-couplers. The present embodiment adopts magnetically coupled isolation devices that have coreless isolation transformers and are provided with isolating DC/DC converters 12 (described later). Note that the circuit structure of the first isolation circuit 5A and the second isolation circuit 5B are basically the same.

The high-voltage-side, which is connected to the driving battery 1, does not have ground lines connected to the vehicle chassis ground 9 to prevent high-voltage electric shock. The low-voltage-side has ground lines connected to the vehicle chassis ground 9.

Power lines of the first measurement circuit 2 and second measurement circuit 3 on the high-voltage-side are supplied with power from the driving battery 1 through the high-voltage-side power supply circuitry 4. The high-voltage-side power supply circuitry 4 supplies power with a voltage stepped-down from the driving battery 1 to the power supply lines of the first measurement circuit 2 and the second measurement circuit 3. The power source apparatus of FIGS. 1 and 2 have a driving battery 1 that is divided into two battery blocks 1A, 1B, and the two battery blocks 1A, 1B are connected in series. However, the driving battery is not necessarily divided into two battery blocks, and could also be configured as a single battery block or as three or more battery blocks.

In the power source apparatus shown in FIG. 1, power is supplied to the power supply lines of both the first measurement circuit 2 and the second measurement circuit 3 from a single high-voltage-side power supply circuit 4. Power is supplied to the high-voltage-side power supply circuit 4 from the positive-side of the two series-connected battery blocks 1A, 1B. Since this circuit configuration establishes a single high-voltage-side power supply circuit 4 on the high-voltage-side and supplies power to the power supply lines of both the first measurement circuit 2 and the second measurement circuit 3, it can simplify circuit structure and reduce cost.

The power source apparatus of FIG. 2 is provided with two high-voltage-side power supply circuits 4 with one of the high-voltage-side power supply circuits 4 supplied with power from the positive-side battery block 1A and the other high-voltage-side power supply circuit 4 supplied with power from the negative-side battery block 1B. In this power source apparatus, power is supplied to the power supply line of the first measurement circuit 2 from the positive-side high-voltage-side power supply circuit 4, and power is supplied to the power supply line of the second measurement circuit 3 from the other high-voltage-side power supply circuit 4. However, power could also be supplied to both high-voltage-side power supply circuits with a single output from the series-connected battery blocks.

Power is supplied to the power supply lines of the isolation circuitry 5 from low-voltage-side power supply circuitry 6 provided on the low-voltage-side. Power is supplied to the power supply line of the first isolation circuit 5A from the first low-voltage-side power supply circuit 6A, and power is supplied to the power supply line of the second isolation circuit 5B from the second low-voltage-side power supply circuit 6B. The first low-voltage-side power supply circuit 6A and the second low-voltage-side power supply circuit 6B convert 12V DC power supplied from the vehicle auxiliary battery 7 to the power supply voltage (for example, 5V) of the first isolation circuit 5A and the second isolation circuit 5B.

The CPU 8 is supplied with power from the vehicle auxiliary battery 7, namely the CPU 8 power supply line is supplied with power from the low-voltage-side regardless of whether the CPU 8 is installed on the high-voltage-side as shown in FIG. 1 or on the low-voltage-side as shown in FIG. 2. In the power source apparatus of FIG. 1, auxiliary battery 7 voltage (12V) is converted to the first isolation circuit 5A power supply voltage (5V) by the first low-voltage-side power supply circuit 6A, first isolation circuit 5A power supply voltage (5V) is isolated by the isolating DC/DC converter 12 contained in the first isolation circuit 5A, and isolated (5V) power is supplied to the CPU 8 power supply line. Specifically, the isolating DC/DC converter 12 is integrated into the first isolation circuit 5A, (5V) power input from the first low-voltage-side power supply circuit 6A is isolated by the DC/DC converter 12, and that isolated power is output to the CPU 8 power supply line. Note that isolation circuitry 5 (the first isolation circuit 5A and second isolation circuit 5B) can also be configured without an isolating DC/DC converter 12. This type of isolation circuitry 5 requires power supplied from the high-voltage-side as well as from the low-voltage-side, and is configured to receive power supplied from the high-voltage-side in addition to receiving power supplied from the auxiliary battery 7. Specifically, separate from power supplied by the auxiliary battery 7, first isolation circuit 5A power is also supplied from the power supply lines that supply power to the first measurement circuit 2 and the second measurement circuit 3. For example, since DC/DC converter circuitry is not generally integrated into a photo-coupler-based isolation circuit, it is necessary to separately supply power to the light-emitting device and to the light-receiving device that make up the isolation circuit. In other words, depending on isolation circuit structure, it is also possible for the first isolation circuit 5A to be configured to receive power from both the low-voltage-side power supply circuitry and the high-voltage-side power supply circuitry.

Since the CPU 8 in the power source apparatus of FIG. 2 is on the low-voltage-side, namely on the output-side of the first isolation circuit 5A, power is supplied to the CPU 8 power supply line from the first low-voltage-side power supply circuit 6A. In this power source apparatus, the first low-voltage-side power supply circuit 6A supplies power to both the first isolation circuit 5A and the CPU 8.

Each of the batteries 10 that make up the driving battery 1 is a single rechargeable battery. However, a battery 10 could also be a plurality of rechargeable batteries connected in series. In a driving battery 1 with a single rechargeable battery used as each battery 10, the rechargeable battery is a lithium ion battery or a lithium polymer battery. In a driving battery with a plurality of series-connected rechargeable batteries used as each battery, the rechargeable batteries can be batteries such as nickel-hydride batteries or nickel cadmium batteries. For example, a driving battery with a plurality of series-connected rechargeable batteries used as each battery could have three to six rechargeable batteries connected in series and used as a battery. However, the driving battery can have batteries that are any type of chargeable battery, and each battery can be a single battery or a plurality of series-connected rechargeable batteries.

Figure 3:
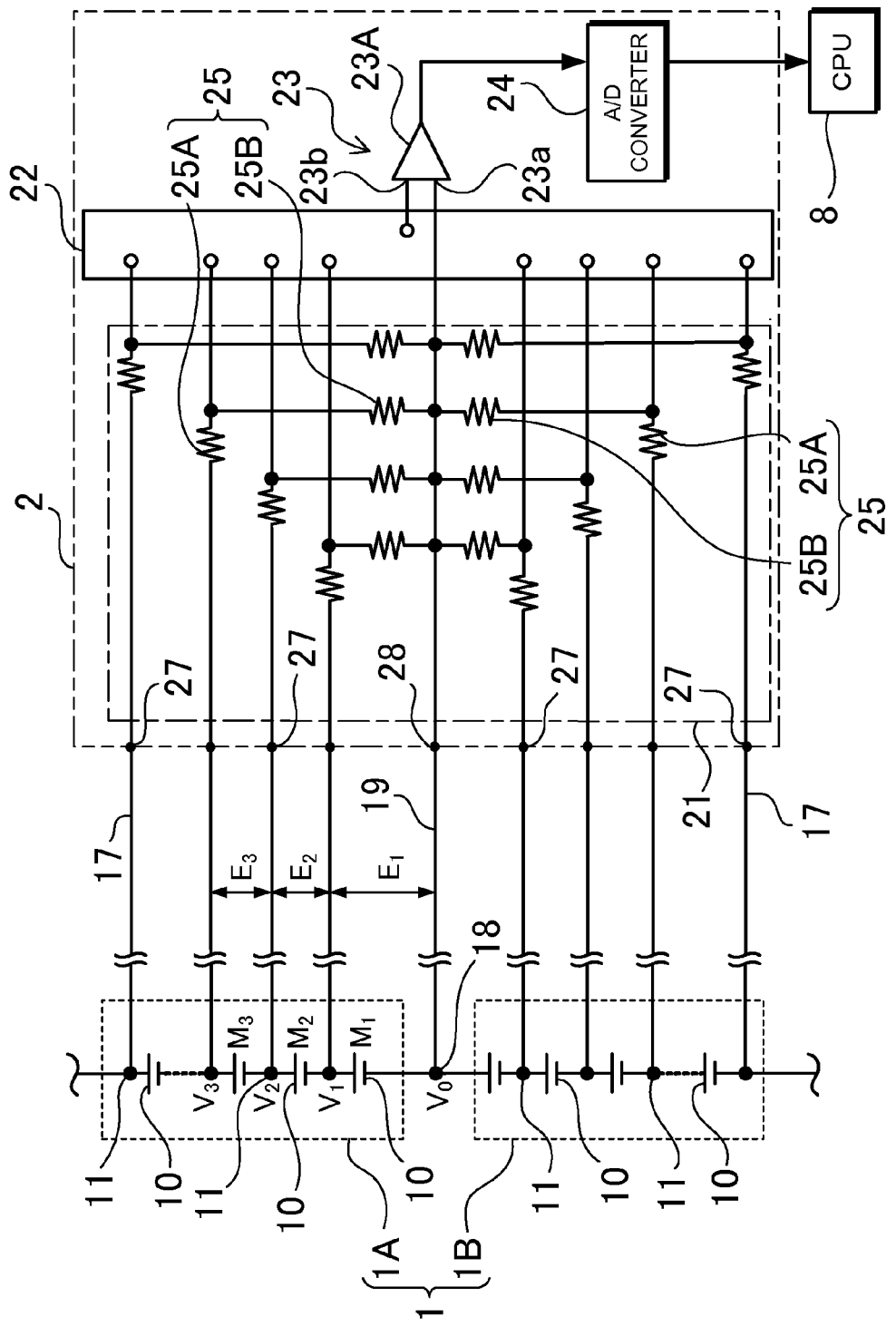
FIG. 3 is a circuit diagram showing one example of the first measurement circuit.

The first measurement circuit 2 detects the voltage at each connection node 11 with respect to the ground line of the driving battery 1 to detect the voltage of each battery 10. A circuit diagram of the first measurement circuit 2 is shown in FIG. 3. The first measurement circuit 2 shown in the figure detects the voltage of each battery 10 by detecting the voltage at each battery 10 connection node 11 with respect to a central reference node 18, which is at the connecting point of the two battery blocks 1A, 1B. This first measurement circuit 2 detects the voltages at all the connection nodes 11 to determine the voltages of all the batteries 10.

The power source apparatus of FIGS. 1-3 have the driving battery 1 divided into a positive-side battery block 1A and a negative-side battery block 1B, which are connected in series, and a single first measurement circuit 2 detects the voltages of the batteries 10 that make up each battery block 1A, 1B. As shown in FIG. 3, the first measurement circuit 2 switches between battery 10 connection nodes 11 with a multiplexer 22 to detect the voltage at each connection node 11. However, in a driving battery with many batteries connected together, a plurality of first measurement circuits could be provided to detect the voltages of the batteries by dividing them into a plurality of groups. For example, a power source apparatus with a driving battery made up of two battery blocks could be provided with two first measurement circuits, and each first measurement circuit could detect the voltages of batteries in one of the two battery blocks.

The first measurement circuit 2 detects connection node 11 voltages with respect to the central reference node 18 to compute the voltage of each battery 10 from the potential difference between connection nodes 11. The central reference node 18 is connected to the reference input terminal 28 of the first measurement circuit 2 via a reference line 19. The reference line 19 is lead-wire that connects via terminals or connectors to the driving battery 1 central reference node 18 at one end and to the first measurement circuit 2 reference input terminal 28 at the other end. This reference line 19 serves as the ground line of the first measurement circuit 2. However, the reference line 19, which is the first measurement circuit 3 ground line, is not connected to the vehicle chassis ground 9 to prevent electric shock.

Battery 10 connection nodes 11 are the voltage detection points, which are connected to first measurement circuit 2 voltage input terminals 27 via voltage detection lines 17. The first measurement circuit 2 detects the voltage at each connection node 11 with respect to the central reference node 18 to compute the voltage of each battery 10. Although not illustrated, the first measurement circuit can also have short-circuit current-limiting resistors connected in each voltage detection line. Short-circuit current-limiting resistors act to prevent high current flow in the event of voltage detection line short-circuit. The resistance value of a short-circuit current-limiting resistor is made large on the order of tens of KΩ to limit the short-circuit current to a small value.

The first measurement circuit 2 in FIG. 3 is provided with resistive voltage divider circuits 21 to divide the voltage at each battery 10 connection node 11, a multiplexer 22 to detect the voltages divided by the voltage divider circuits 21 via time-division switching, a voltage detection section 23 connected to the output-side of the multiplexer 22, and an analog-to-digital (A/D) converter 24 to convert voltage detection section 23 output to a digital signal.

Each resistive voltage divider circuit 21 is two resistors 25 connected in series to divide the voltage at a connection node 11 and input it to the multiplexer 22. Maximum voltage at the connection nodes 11 is a higher voltage than the maximum allowable input voltage of the multiplexer 22. A voltage divider circuit 21 reduces the connection node 11 voltage by a given divider ratio. The divider ratio of a voltage divider circuit 21 is set by the resistor values of the series-connected resistors 25. The divider ratio of a voltage divider circuit 21 can be made large to reduce multiplexer 22 input voltage by increasing the value of the series-connected resistor 25A relative to the resistor 25B connected in parallel with the multiplexer 22 input.

Preferably, a voltage divider circuit 21 divides connection node 11 voltage down to several volts for input to the multiplexer 22. Since the voltage divider circuit 21 reduces connection node 11 voltage by a divider ratio set by the resistor ratio, the detected voltage from the voltage detection section 23 and A/D converter 24 is processed by the CPU 8 and corrected to the actual voltage taking the voltage divider ratio into account. For example, if the divider ratio of the voltage divider circuit 21 is 1/50, the CPU 8 multiples the detected voltage by 50 to obtain the connection node 11 voltage.

Resistive voltage divider circuits 21 are connected to each connection node 11. Specifically, the voltage at every connection node 11 is divided-down by a voltage divider circuit 21 and input to the multiplexer 22. The divider ratio of the voltage divider circuit 21 connected to each connection node 11 is set to make the voltages input to the multiplexer 22 approximately equal.

The multiplexer 22 is connected to the input-side of the voltage detection section 23, and switches between the plurality of connection nodes 11 to input the voltage at each connection node 11 to the voltage detection section 23. The multiplexer 22 sequentially switches the connection node 11 for voltage detection and inputs the voltages at the connection nodes 11 of every battery 10 to the voltage detection section 23. Accordingly, the multiplexer 22 is connected to the input-side of the voltage detection section 23 and sequentially switches connection nodes 11 for the battery 10 being detected by the voltage detection section 23.

The voltage detection section 23 detects battery 10 connection node 11 voltages with respect to the central reference node 18 to detect battery 10 voltage. The central reference node 18 is the center point of the plurality of series-connected batteries 10, and the number of batteries 10 on the positive-side of the central reference node 18 is approximately equal to the number of batteries 10 on the negative-side. The voltage detection section 23 of the figure is a difference amplifier 23A. The central reference node 18 is connected to the reference input terminal 23a of the difference amplifier 23A, and battery 10 connection nodes 11 are connected via the multiplexer 22 to the voltage input terminal 23b of the difference amplifier 23A to detect connection node 11 voltages with respect to the central reference node 18. However, the voltage detection section does not necessarily have to be a difference amplifier. This is because the central reference node could be connected to the inverting input (reference input) of a general-purpose operational amplifier (in a stable feedback configuration), battery connection nodes could be connected to the non-inverting input via the multiplexer, and connection node voltages could also be detected with respect to the central reference node.

Battery 10 voltage is detected from the potential difference between the connection nodes 11 on both sides of the battery 10. For example, the voltage E2 of battery M2 in FIG. 3 is detected from V2−V1, and the voltage E3 of battery M3 is detected from V3−V2. This type of computation to detect battery 10 voltage from the connection node 11 voltages is performed by the CPU 8.

The first measurement circuit 2 of the figure has the voltage detection section 23 connected to the output-side of the multiplexer 22 and the A/D converter 24 connected to the output-side of the voltage detection section 23. In this first measurement circuit 2, connection node 11 voltages are sequentially detected due to multiplexer 22 switching by the voltage detection section 23, voltage detection section 23 output is converted to digital signals by the A/D converter 24, and the digital signals are input to the CPU 8. The CPU 8 arithmetically processes the input digital voltage signals to detect battery 10 voltages.

The first measurement circuit 2 described above is provided with a multiplexer 22 on the input-side, sequentially connects the input-side to battery 10 connection nodes 11 via the multiplexer 22, and sequentially detects the voltages of the connection nodes 11. The detected voltages are converted to digital signals by the A/D converter 24 and output. The voltage of each battery 10 is detected from the connection node 11 voltages output from the A/D converter 24. Since the potential difference between adjacent connection nodes 11 is the battery 10 voltage, the voltage of each battery 10 is detected from the potential difference between each pair of adjacent connection nodes 11. Connection node 11 voltage digital signals can be processed by a computation circuit inside the first measurement circuit 2. However, in the power source apparatus of FIGS. 1 and 2, connection node 11 voltage digital signals output from the first measurement circuit 2 are processed to compute battery 10 voltage by the CPU 8, which is connected outside the first measurement circuit 2. The CPU 8 processes connection node 11 voltage digital signals to compute the voltage of each battery 10.

As described above, the first measurement circuit 2, which detects the voltage of each battery 10 from the potential difference between battery 10 connection nodes 11, can have a simple circuit structure. However, the first measurement circuit could also detect the voltage of each battery by connecting the positive and negative electrode terminals of each battery to the input-side of the first measurement circuit.

In the power source apparatus of FIG. 1, the CPU 8 that processes first measurement circuit 2 output to compute each battery 10 voltage is disposed on the high-voltage-side. The CPU 8 computes the voltage of each battery 10 from the potential difference between connection nodes 11 input from the first measurement circuit 2, computes battery 10 remaining charge capacity from battery 10 voltage, and outputs those results.

Since the CPU 8 in the power source apparatus of FIG. 1 is disposed on the high-voltage-side, battery 10 voltage signals processed by the CPU 8 are isolated by the first isolation circuit 5A and output to the vehicle-side. Signals output from the first isolation circuit 5A are input to the vehicle-side ECU 13. In the power source apparatus of FIG. 2, potential difference between connection nodes detected by the first measurement circuit 2 is transmitted to the CPU 8 through the first isolation circuit 5A, battery 10 and remaining charge capacity are computed from the signals input to the CPU 8, and signals indicating battery 10 voltage and remaining charge capacity are output from the vehicle-side to the vehicle-side. Signals output from the CPU 8 are input to the vehicle-side ECU 13.

The second measurement circuit 3 detects over-charging and over-discharging of the batteries 10 that make up the driving battery 1. If any battery 10 becomes over-charged or over-discharged, an error signal indicating the abnormality is output to the vehicle-side. The second measurement circuit 3 determines battery 10 over-charging and over-discharging by comparing battery 10 voltage with a pre-stored maximum and minimum voltage. If the detected battery 10 voltage is greater than the maximum voltage, over-charging is judged, and if it is less than the minimum voltage over-discharging is judged.

Figure 4:
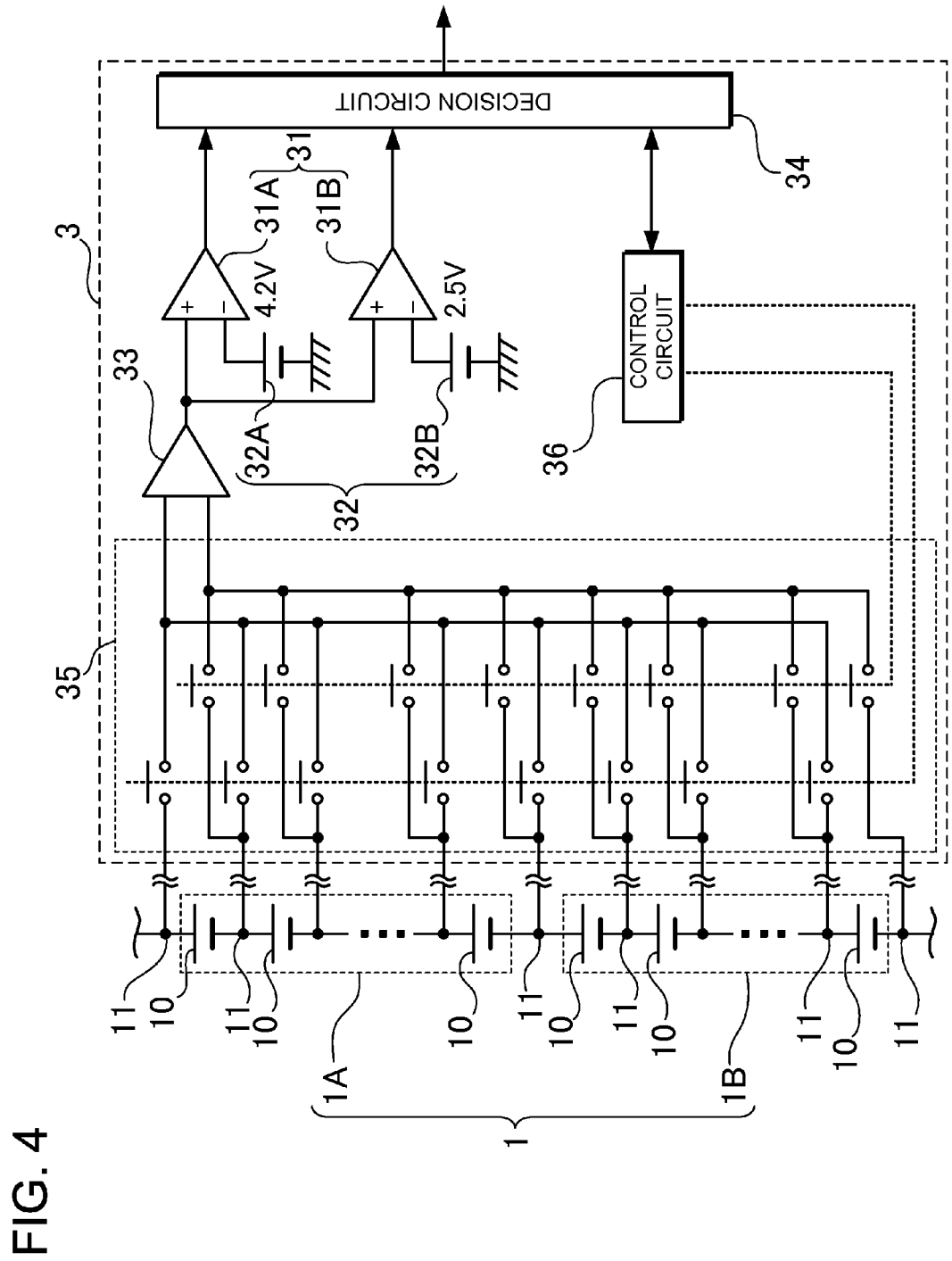
FIG. 4 is a circuit diagram showing one example of the second measurement circuit.

The second measurement circuit 3 is made up of difference amplifiers and reference voltage sources, or is made up of an A/D converter and a computation circuit. FIG. 4 shows a second measurement circuit 3 made up of difference amplifiers 31 (used as comparators) and reference voltage sources 32. The second measurement circuit 3 shown in the figure is provided with a buffer amplifier 33 that is a difference amplifier on the input-side, two difference amplifiers 31 (used as comparators) with buffer amplifier 33 output connected to one input terminal and a reference voltage source 32 connected to the other input terminal, and a decision circuit 34 to judge over-charging or over-discharging from difference amplifier 31 output. The input-side of the buffer amplifier 33 is sequentially connected to the positive and negative electrode terminals of each battery 10 via switches 35. The switches 35 are controlled ON and OFF by a control circuit 36 to sequentially connect the positive and negative electrode terminals of each battery 10 to the buffer amplifier 33. The buffer amplifier 33 sequentially outputs the voltage of each battery 10 to the difference amplifiers 31.

The difference amplifiers 31 (used as comparators) are a first difference amplifier 31A that detects over-charging, and a second difference amplifier 31B that detects over-discharging. In the second measurement circuit 3 of the figure, a first reference voltage source 32A, which is the maximum voltage (for example, 4.2V for lithium ion batteries), is input to the inverting input of the first difference amplifier 31A to detect over-charging, and a second reference voltage source 32B, which is the minimum voltage (for example, 2.5V), is input to the inverting input of the second difference amplifier 31B to detect over-discharging. If battery 10 voltage exceeds the maximum voltage, the first difference amplifier 31A outputs a HIGH level, and if battery 10 voltage drops below the minimum voltage, the second difference amplifier 31B outputs a LOW level. Accordingly, the decision circuit 34 determines over-charging when the first difference amplifier 31A outputs a HIGH level and determines over-discharging when the second difference amplifier 31B outputs a LOW level. Although the second measurement circuit 3 inputs the reference voltage sources 32 to the inverting inputs of the difference amplifiers 31, over-charging and over-discharging could also be detected by inputting the reference voltage sources 32 to the non-inverting inputs of the difference amplifiers 31. In that case, the second measurement circuit would determine over-charging when the first difference amplifier output a LOW level, and determine over-discharging when the second difference amplifier output a HIGH level.

In FIG. 4, a single second measurement circuit 3 detects over-charging and over-discharging for all the batteries 10 that make up the two battery blocks 1A, 1B. However, for a driving battery having many batteries connected together, the batteries could be divided into a plurality of groups and a plurality of second measurement circuits could be provided to determine over-charging and over-discharging of the batteries in each respective group. For example, in a power source apparatus with a driving battery made up of two battery blocks, a second measurement circuit could be provided for each battery block, and each of the two second measurement circuit could determine over-charging and over-discharging for the batteries in its respective battery block.

Although not illustrated, a second measurement circuit can be made up of an A/D converter and a computation circuit. In that case, the maximum voltage and minimum voltage are stored in the computation circuit, and the voltage of each battery is compared with the maximum and minimum voltages to determine battery over-charging and over-discharging.

The power source apparatus described above detects the voltage of each battery 10 that makes up the driving battery 1, issues voltage signals to the vehicle-side, detects battery 10 over-charging and over-discharging, and issues error signals to the vehicle-side in the following manner.

[Voltage of Each Battery 10]

The first measurement circuit 2 detects voltages at the connection nodes 11 of the plurality of batteries 10 connected in series to form the driving battery 1, computes the voltage of each battery 10 from the potential difference between connection nodes 11 with the CPU 8, and outputs the computed battery voltages to the vehicle-side. The high-voltage-side power supply circuitry 4 steps-down the high-voltage of the driving battery 1 and supplies it to the power supply line of the first measurement circuit 2. The power supply line of the CPU 8, which processes signals output from the first measurement circuit 2, is supplied with power from the first low-voltage-side power supply circuit 6A through the first isolation circuit 5A. The first low-voltage-side power supply circuit 6A converts auxiliary battery 7 12V power to 5V and supplies it to the first isolation circuit 5A power supply line. The first isolation circuit 5A contains an isolating DC/DC converter 12 that isolates the 5V input power, namely does not connect the output power to the vehicle chassis ground, and supplies it to the CPU 8. The CPU 8 operates on power from the first isolation circuit 5A, and processes signals input from the first measurement circuit 2 to compute battery 10 voltages. Computed battery 10 voltage signals are isolated by the first isolation circuit 5A and output to the vehicle-side. The first isolation circuit 5A operates on 5V power from the first low-voltage-side power supply circuit 6A, isolates voltage signals input from the CPU 8, and outputs the isolated signals to the vehicle-side.

[Over-Charging and Over-Discharging of Each Battery 10]

The second measurement circuit 3 detects the voltages of the batteries 10 in the driving battery 1, and compares the detected battery 10 voltages with the maximum voltage and minimum voltage to detect over-charging and over-discharging. If any battery 10 becomes over-charged or over-discharged, an error signal is issued to the vehicle-side. The high-voltage-side power supply circuitry 4 steps-down the high-voltage of the driving battery 1 and supplies it to the power supply line of the second measurement circuit 3. Error signals issued by the second measurement circuit 3 are isolated by the second isolation circuit 5B, which isolates the high-voltage-side from the low-voltage-side. Specifically, the second isolation circuit 5B outputs error signals to the vehicle-side without connecting the high and low-voltage-side ground lines together. The second isolation circuit 5B operates on power supplied to its power supply line from the second low-voltage-side power supply circuit 6B. The second low-voltage-side power supply circuit 6B converts auxiliary battery 7 12V power to 5V second isolation circuit 5B operating power, and supplies it to the second isolation circuit 5B power supply line.

The power source apparatus described above outputs the voltage of each battery 10 to the vehicle-side via the first measurement circuit 2 and the first isolation circuit 5A, and outputs battery 10 over-charging and over-discharging signals to the vehicle-side via the second measurement circuit 3 and the second isolation circuit 5B. Here, voltage signals output to the vehicle-side pass from the high-voltage-side to the low-voltage-side in a manner isolated by the first isolation circuit 5A operating on power from the first low-voltage-side power supply circuit 6A. Error signals are output to the vehicle-side via the second isolation circuit 5B operating on power from the second low-voltage-side power supply circuit 6B. In the power source apparatus described above, battery 10 voltage signals and battery 10 error signals are transmitted separately to the vehicle-side by independent circuitry. Consequently, if malfunction occurs in either of the (redundant) low-voltage-side power supply circuit 6 and isolation circuit 5 paths, either voltage signals or error signals can still be reliably transmitted to the vehicle-side. Therefore, the driving battery 1 can be controlled from the vehicle-side based on the voltage signals, the driving battery 1 can be controlled according to over-charging or over-discharging signals, and the vehicle can be operated safely while protecting the driving battery 1.

The power source apparatus described above can be used as a power source on-board a vehicle. An electric powered vehicle such as a hybrid vehicle driven by both an engine and an electric motor, a plug-in hybrid vehicle, or an electric vehicle driven by an electric motor only can be equipped with the power source apparatus and use it as an on-board power source.

(Power Source Apparatus in a Hybrid Vehicle Application)

Figure 5:
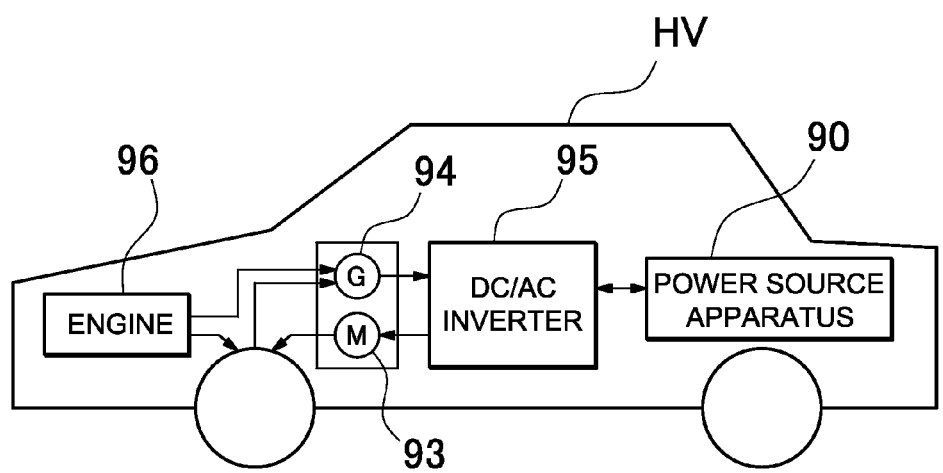
FIG. 5 is a block diagram showing an example of a hybrid vehicle, which is driven by a motor and an engine, equipped with a power source apparatus.

FIG. 5 shows an example of power source apparatus installation on-board a hybrid vehicle, which is driven by both an engine and an electric motor. The vehicle HV equipped with the power source apparatus 90 shown in this figure is provided with an engine 96 and a driving motor 93 to drive the vehicle HV, a power source apparatus 90 to supply power to the motor 93, and a generator 94 to charge the power source apparatus 90 batteries. The power source apparatus 90 is connected to the motor 93 and generator 94 via a direct current-to-alternating current (DC/AC) inverter 95. The vehicle HV runs on both the motor 93 and engine 96 while charging the batteries in the power source apparatus 90. In operating modes where engine efficiency is poor such as during acceleration and low speed cruise, the vehicle is driven by the motor 93. The motor 93 operates on power supplied from the power source apparatus 90. The generator 94 is driven by the engine 96 or by regenerative braking when the vehicle brake pedal is pressed and operates to charge the power source apparatus 90 batteries.

(Power Source Apparatus in an Electric Vehicle Application)

Figure 6:
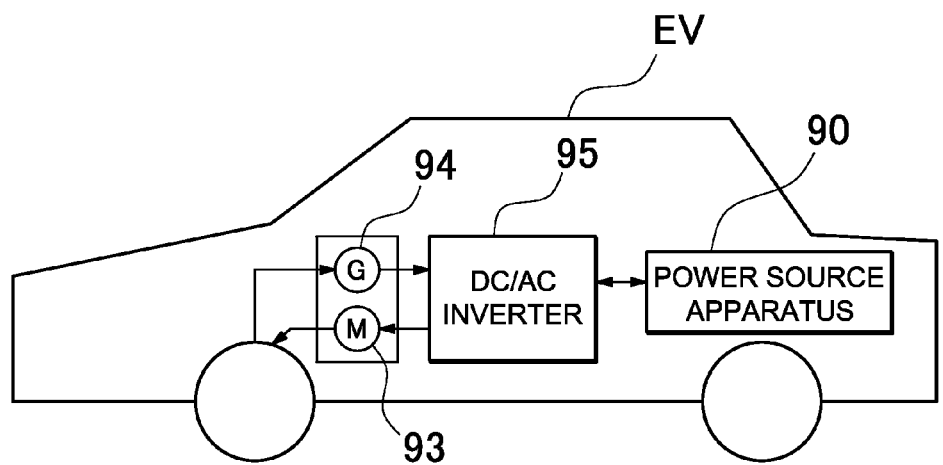
FIG. 6 is a block diagram showing an example of an electric vehicle, which is driven by a motor only, equipped with a power source apparatus.

FIG. 6 shows an example of power source apparatus installation on-board an electric vehicle, which is driven by an electric motor only. The vehicle EV equipped with the power source apparatus 90 shown in this figure is provided with a driving motor 93 to drive the vehicle EV, a power source apparatus 90 to supply power to the motor 93, and a generator 94 to charge the power source apparatus 90 batteries. The power source apparatus 90 is connected to the motor 93 and generator 94 via a DC/AC inverter 95. The motor 93 operates on power supplied from the power source apparatus 90. The generator 94 is driven by, energy from regenerative braking and operates to charge the power source apparatus 90 batteries.

[Industrial Applicability]

The automotive power source apparatus of the present invention can be appropriately used as a power source apparatus in a vehicle such as a plug-in hybrid electric vehicle that can switch between an electric vehicle mode and a hybrid vehicle mode, a hybrid (electric) vehicle, and an electric vehicle. It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2011-213496 filed in Japan on Sep. 28, 2011, the content of which is incorporated herein by reference.

What is claimed is:

1. An automotive power source apparatus comprising:
a driving battery that supplies power to the motor that drives a vehicle;
a first measurement circuit that detects voltages of the individual batteries that make up the driving battery; and
a second measurement circuit that detects over-charging and over-discharging of the batteries that make up the driving battery,
wherein the driving battery comprises:
high-voltage-side power supply circuitry that is isolated from the vehicle chassis ground and supplies power from the driving battery to the power supply lines of the first measurement circuit and the second measurement circuit;
isolation circuitry that isolates output from the first measurement circuit and the second measurement circuit and outputs it to the vehicle-side; and
low-voltage-side power supply circuitry that supplies power to the power supply lines of the isolation circuitry using the vehicle auxiliary battery as the power source,
wherein the isolation circuitry is made up of a first isolation circuit that isolates output from the first measurement circuit and outputs it to the vehicle-side, and a second isolation circuit that isolates output from the second measurement circuit and outputs it to the vehicle-side,
wherein the low-voltage-side power supply circuitry is made up of a first low-voltage-side power supply circuit that supplies power to the power supply line of the first isolation circuit, and a second low-voltage-side power supply circuit that supplies power to the power supply line of the second isolation circuit,
wherein the high-voltage-side power supply circuitry supplies power from the driving battery to the power supply lines of the first measurement circuit and the second measurement circuit,
wherein the first low-voltage-side power supply circuit supplies power to the power supply line of the first isolation circuit, and the second low-voltage-side power supply circuit supplies power to the power supply line of the second isolation circuit,
wherein the first measurement circuit, which is powered by the high-voltage-side power supply circuitry, outputs voltage signals to the vehicle-side via the first isolation circuit, which is powered by the first low-voltage-side power supply circuit, and
wherein the second measurement circuit, which is powered by the high-voltage-side power supply circuitry, outputs battery abnormality (error) signals to the vehicle-side via the second isolation circuit, which is powered by the second low-voltage-side power supply circuit.

2. The automotive power source apparatus as cited in claim 1 further comprising a CPU that computationally processes first measurement circuit output signals, and the signals processed by the CPU are output to the vehicle-side via the first isolation circuit.

3. The automotive power source apparatus as cited in claim 2 wherein the first isolation circuit is provided with an isolating DC/DC converter to isolate power from the first low-voltage-side power supply circuit and supply it to the CPU.

4. The automotive power source apparatus as cited in claim 1 further comprising a CPU that computationally processes first isolation circuit output signals, the low-voltage-side power supply circuitry supplies operating power to the CPU, and the signals processed by the CPU are output to the vehicle-side.

5. A vehicle equipped with the power source apparatus as cited in claims 1.

* * * * *